United States Patent

Hanan

[15] 3,700,208

[45] Oct. 24, 1972

[54] AIR VALVE SAFETY LOCK

[72] Inventor: John Hanan, 912 Versailles Avenue, Alameda, Calif. 94501

[22] Filed: June 30, 1971

[21] Appl. No.: 158,267

[52] U.S. Cl.................................................251/90
[51] Int. Cl.............................................F16k 35/00
[58] Field of Search.........251/90, 111, 114, 115, 116

[56] References Cited

UNITED STATES PATENTS 1,606,191   11/1926   Siebenmann..........251/114 X

*Primary Examiner*—Henry T. Klinksiek
*Attorney*—Harris Zimmerman

[57] ABSTRACT

A safety lock is described for preventing unintentional actuation of an air control valve. The safety lock includes a disc-shaped base which is securable to an air control valve with the actuating toggle for the control valve projecting therethrough. A locking pawl is pivotally secured to the base for movement between a position at which it blocks movement of the valve control lever between the valve unactuated and the valve actuated positions, and a second location at which it permits the valve lever to be manipulated. A leaf spring is also included as a part of the safety lock for resiliently urging the locking pawl to its position preventing movement of the valve lever to its valve actuating position.

8 Claims, 4 Drawing Figures

PATENTED OCT 24 1972  3,700,208
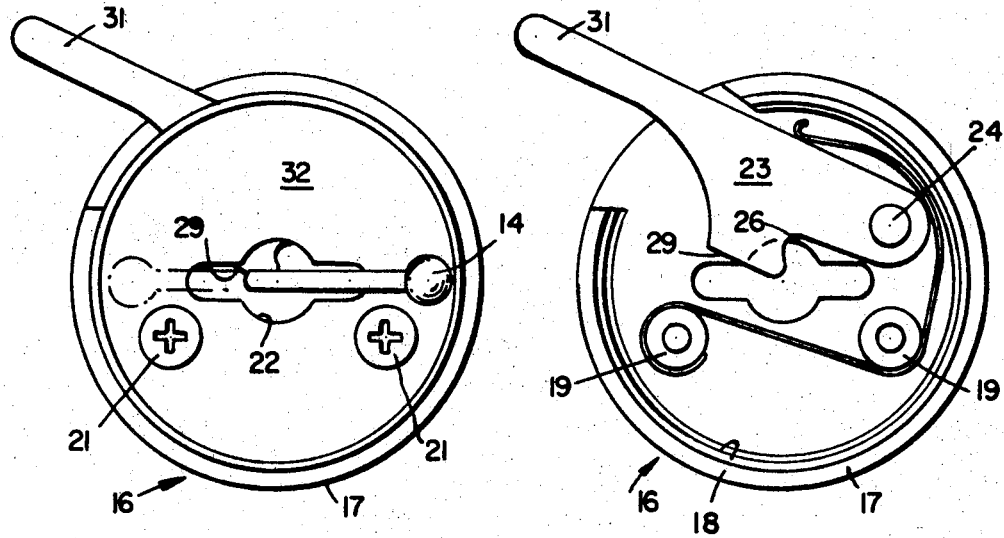
FIG_2    FIG_3
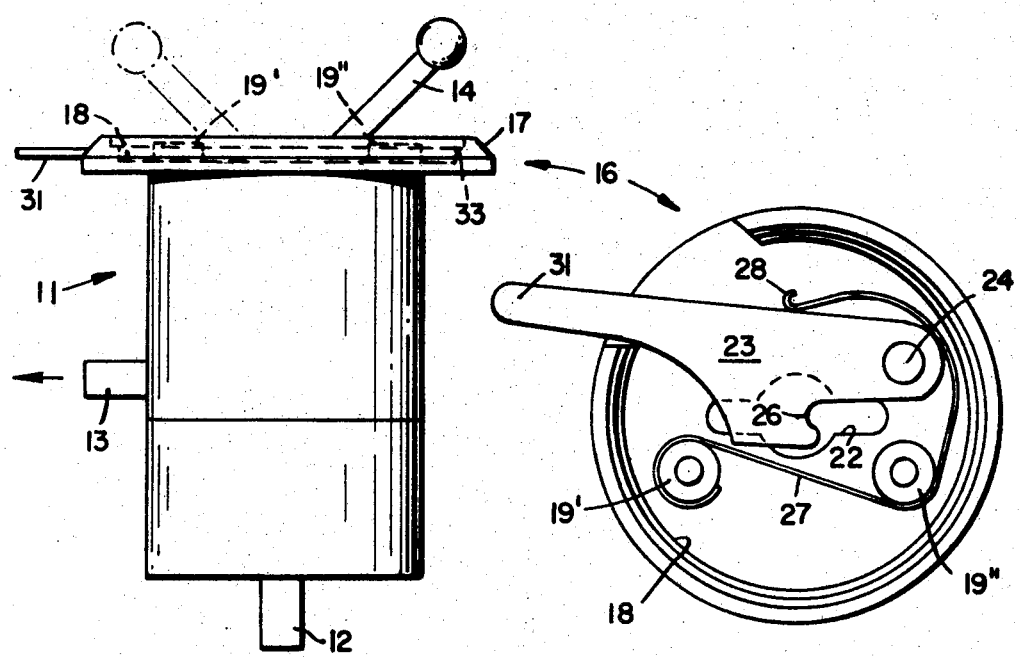
FIG_1    FIG_4
INVENTOR
JOHN HANAN
BY
Harris Zimmerman
ATTORNEYS

AIR VALVE SAFETY LOCK

BACKGROUND OF THE INVENTION

This invention relates to fluid flow control valves and, more particularly, to latching apparatus for preventing unintentional operation of an actuating lever for the valve.

Large trucks and construction vehicles often include a hydraulic or pneumatic system for effecting operation of various mechanisms. For example, most trucks include a pressurized air system for controlling the differential transmission and apparatus for moving a fifth wheel or tail gate. The air system for operating such mechanisms is normally controlled by means of valves or the like which are often mounted within the cab of the truck along with the other controls for operating the truck and its various mechanisms.

Quite often, when an operator of a vehicle such as a truck wishes to actuate a control to perform some operation, he is also otherwise occupied such as in driving the vehicle. Because of such preoccupation, it is not unusual for an operator to erroneously actuate a control valve for the pneumatic system when he actually desires to actuate some other control. This can cause operation of a mechanism of the truck at a time when its operation is undesirable. A serious accident is often the result.

There are many other situations in which an operator may unintentionally operate a control valve for an air system. For example, because of the necessity of an operator to move around within the cab of a truck, he sometimes accidentally contacts the actuating lever of a valve and thus unintentionally actuates the same.

SUMMARY OF THE INVENTION

The present invention is a safety lock which prevents unintentional or accidental operation of an actuating lever on a fluid flow control valve, while yet enabling simple actuation of the same when intended. In its basic aspects, the safety lock includes a locking pawl which is adapted to be mounted adjacent the valve actuating lever for pivotal movement between a first position or location at which it prevents movement of the actuating lever to its actuated position and a second position at which it enables such movement. Spring means are also provided as a part of the safety lock for resiliently urging the locking pawl to its locking location and thus normally assuring that the actuating lever is maintained in the locking location. A handle is associated with the locking pawl which enables an operator to manually pivot such pawl against the urging of the spring to its second position when desired so that the valve can be actuated.

It will be seen from the above that unless the locking pawl is intentionally moved to its release position, an operator cannot move the actuating lever. This will prevent the actuating lever from being moved by accidental contact therewith, or without a well considered manipulation by the operator. In this connection, most desirably the direction through which the handle portion must be moved to release the actuating lever for its movement is different than that through which the actuating lever is to be moved. This substantially minimizes the chance that both the actuating lever and locking pawl handle are simultaneously accidentally contacted and moved. That is, most often any object which might contact both the locking pawl and the actuating lever and tending to move the same, will tend to move both in the same direction. Since one must be moved in a direction different than the other before the control valve can be actuated, the chances of such an object being successful and unintentionally operating the valve are negligible.

The safety lock of the invention is also desirably provided as a single unit which can be simply mounted on control valves already in use, as well as on new control valves. Preferably for this purpose the safety lock includes a base member to which both the locking pawl and the spring are secured to provide the integral unit. A slot, or, more broadly, an aperture is provided through the base member at a location adjacent the locking pawl for extension through the base of an actuating lever for the control valve. The locking location of the locking pawl is then one in which the pawl overlies the slot and prevents movement of the valve actuating lever along the slot to its actuated position.

The invention includes other features and advantages which will be described or will become apparent from the following more detailed description of a preferred embodiment.

BRIEF DESCRIPTION OF THE DRAWING

FIG. 1 is a side elevational view of a schematically shown air control valve with a preferred embodiment of the safety lock of the invention installed thereon;

FIG. 2 is a plan view of the control valve of FIG. 1 illustrating the relationship of the instant invention to the actuating lever thereof;

FIG. 3 is a plan view of the preferred safety lock of the invention showing the locking pawl thereof in the locking or actuating lever blocking position.

DETAILED DESCRIPTION OF THE PREFERRED EMBODIMENT

FIG. 1 schematically illustrates a typical air control valve, generally referred to by the reference numeral 11. In accordance with conventional practice, the valve 11 includes a fluid pressure inlet shown in the form of an air nipple 12, and a fluid pressure outlet illustrated as a nipple 13. As is also common, the valve includes an actuating lever or toggle 14 which can be manually pivoted from its unactuated position shown in full in FIG. 1 to the actuated position shown in phantom, and vice versa. Manipulation of the lever between its actuated and unactuated positions will cause suitable mechanism within the control valve to communicate fluid pressure entering nipple 12 with the outlet nipple 13. One conventional manner of accomplishing this is for movement of the lever 14 between its actuated and unactuated positions to cause a cam connected thereto to depress a piston within the valve body from a position at which it blocks communication between the two nipples to a position in which it enables passage of fluid pressure therebetween.

As mentioned previously, control values of this type are often mounted within the cab of trucks and other heavy equipment to enable the operator to control operation of various pneumatically operated mechanisms associated with the truck. However, it is not unusual for an operator to either mistakenly or accidentally manipulate the control valve lever 14 when it is not intended that the controlled mechanism be operated. This has resulted in accidents and injuries.

The safety lock of the invention is designed to prevent all but well considered manipulations of the control lever 14 between its unactuated and actuated positions. Such safety lock, generally referred to by the reference numeral 16, is a compact, self-contained unit that is mountable on existing fluid flow control valves. More particularly, the safety lock 16 includes a discular base member 17 adapted to overlie the face of the valve body from which lever 14 extends. In this connection, the upper face of the base member 17 is substantially removed to provide a cylindrical cavity 18 for housing the various operable parts of the lock mechanism. A pair of spaced apart bushings 19 project upwardly from the bottom wall of cavity 18 for reception of fastening devices, such as the bolts 21 (FIG. 2), for securing the base member 17 and, hence, the remainder of the safety lock to the body of the control valve.

An elongated slot or aperture 22 extends diametrically through the bottom wall of the base member 17 for reception and extension therethrough of the toggle lever 14. As is illustrated, the aperture 22 is elongated in the direction of movement of the lever 14 so that the base member does not hinder either actuation or deactuation of the control valve. It also includes an enlarged central section to facilitate the placement of the base over the toggle 14 during assembly.

A locking pawl 23 is pivotally mounted on the bottom wall of the cavity 18 via a pivot pin 24 which extends upwardly from such cavity bottom wall. The location of pin 24 and, hence, the pivot point for the locking pawl, is adjacent the slot 22 at a position at which the pawl is pivotal between the release location shown in FIG. 3 and the locking location illustrated in FIG. 4. When the locking pawl is in the release location of FIG. 3, it is free of the path of travel of the lever 14 between its unactuated and actuated positions and thus allows an operator to actuate the control valve. However, as can be seen from FIG. 4, when the locking pawl is in the locking location it blocks the path of travel of the actuating lever from its unactuated position to the actuated position. In this connection, the locking pawl is provided with a reentrant portion 26 which overlies the path of travel of the actuating lever. Such reentrant portion acts as a "catch" which receives the actuating lever when any attempt is made to move it to its valve actuating position and the locking pawl is in its locking location own in FIG. 4. Because this catch portion is reentrant, the actuating lever will not be able to force the locking pawl out of its locking location once such lever is received within the catch. This assures integrity of the safety lock.

Spring means are also provided for resiliently urging the locking pawl to its locking location. That is, an elongated leaf spring 27 is secured to the base within the cavity in a manner causing it to bear against the locking pawl and maintain it at its location blocking the path of travel of the actuating lever. The securance of the spring within the cavity 18 is simply accomplished. More particularly, one end of the leaf spring is secured to one of the bushings 19'' by being wrapped therearound, and the spring passes around the other one of the bushings 19'' before terminating in an end 28 which bears against the edge of the locking pawl opposite to the aperture. It will be seen that by appropriately shaping the spring as is illustrated, the end 28 thereof will tend to resiliently urge the locking pawl to the locking location blocking the path of travel of the actuating lever.

It should be further noted that the locking pawl includes an edge 29 which bears against the actuating lever 14 when it is in its actuated position to hold the locking pawl in the release location. This prevents the locking pawl from moving to its locking location during the time the control valve is actuated. It thus, in effect, disarms the safety lock so that it is only operable to prevent the actuating lever to be moved to the actuated position. It therefore does not hinder the deactuation of the mechanism controlled by the valve. This enables an operator to quickly deactuate the mechanism to prevent an accident or the like without having to be concerned about the safety lock.

The locking pawl 23 is also provided with a handle portion 31 to facilitate its movement against the urging of the spring 27 from its locking location shown in FIG. 4 to the release location shown in FIG. 3. such handle portion extends through a relieved or notched portion of the peripheral wall defining the cavity 18 of the base member to a location beyond the circular periphery of such base. Such handle 31 is therefore easily grasped for manipulation of the locking pawl.

It should be noted that the general direction through which the handle for the locking pawl must be moved to bring the locking pawl to the release location is different from the general direction through which the actuating lever 14 for the valve must be moved to actuate the valve. That is, the locking pawl must be angularly moved from the left to the right as viewed in the drawing to move to its release location, whereas the actuating lever 14 must be moved from the right to the left. This is an added safety feature of the invention. Any force, such as an operator's knee, striking or bearing against the actuating lever 14 intending to move it to the actuated position would be in the wrong direction to also move the locking pawl to its release location. Thus, accidental movement of both the locking pawl and the actuating lever at the same time is minimized.

The safety lock of the invention is completed by a cover plate 32 (FIG. 2) which closes the cavity 18. Such cover plate rests upon a ledge 33 around the periphery of the cavity and is secured to the base member by the same bolts 21 which secure the full safety lock unit to the valve body. Such cover plate also acts to maintain the spring 27 in position within the cavity, as well as to prevent the locking pawl 23 from coming off pivot pin 24.

It will appreciated from the above that the safety lock of the invention is a simple, self-contained unit providing the extra measure of safety for pneumatic valves that can often mean the difference between an accident and no accident. And while the invention has been described with respect to a preferred embodiment thereof, it will be appreciated by those skilled in the art that many changes and variations can be made without departing from the spirit of the invention. It is therefore intended that the coverage be limited only by the language of the claims and their equivalents.

I claim:

1. A safety lock for preventing unintentional operation of an actuating lever on a fluid flow control valve comprising a locking pawl adapted to be mounted adjacent said actuating lever for pivotal movement between a locking location blocking the path of travel of said actuating lever from its unactuated to its actuated position and a release location free from said path whereby said lever can be moved to said actuated position, spring means for resiliently urging said locking pawl to said locking location blocking the path of travel of said lever and a handle portion associated with said locking pawl for manual pivoting of said pawl against the urging of said spring means to said release location enabling actuation of said valve by said lever.

2. The safety lock of claim 1 wherein the general direction through which the handle portion of said locking pawl is moved to pivot said pawl to its release location is different from the general direction through which said actuating lever is moved from its unactuated to its actuated position does not cause movement of said locking pawl to its release location.

3. The safety lock of claim 1 wherein said pawl includes a reentrant portion which overlies said path of travel of said actuating lever when said pawl is in said locking location to prevent attempted movement of said actuating lever from its unactuated position to its actuated position from forcing said locking pawl against said spring means out of said path of travel.

4. The safety lock of claim 3 further includes a base member which is securable to a fluid control valve with the actuating lever thereof projecting through an aperture in said base member, both said locking pawl and said spring means being directly secured to said base member to provide therewith a separate unit which is mountable on an existing fluid flow control valve.

5. The safety lock of claim 4 wherein said latch pawl is pivotally mounted on a face of said base member adjacent said aperture and said locking location therefor overlies said aperture and the path of travel of said actuating lever therethrough between its unactuated and actuated positions.

6. The safety lock of claim 5 wherein said handle portion associated with said locking pawl extends beyond the periphery of said base member to facilitate grasping thereof for pivoting of said pawl.

7. The safety lock of claim 4 wherein said base member further includes at least one bushing which is integral therewith to facilitate reception therethrough of a fastening device for securing the same to a fluid flow control valve body, and said spring means is a leaf spring anchored to said base by said bushing.

8. The safety lock of claim 7 wherein said base is discular in shape, said locking pawl is pivoted thereto adjacent said aperture with the handle portion thereof extending beyond the circular periphery of said base to facilitate manipulation thereof, and a pair of said bushings are provided spaced from one another with one end of said leaf spring secured to one of said bushings by being wrapped therearound and said spring passing around the other one of said bushings for appropriate positioning thereof with its free end against said locking pawl to provide said resilient urging of the same to said locking location blocking the path of travel of said lever.

* * * * *